United States Patent

Merz et al.

[11] 3,865,943
[45] Feb. 11, 1975

[54] PHARMACEUTICAL COMPOSITIONS CONTAINING AN N-(FURYL-METHYL)-3-OXY-MORPHINAN AND METHOD OF USE

[75] Inventors: Herbert Merz; Adolf Langbein; Helmut Wick; Klaus Stockhaus, all of Ingelheim am Rhein, Germany

[73] Assignee: Boehringer Ingelheim G.m.b.H., Ingelheim am Rhein, Germany

[22] Filed: Dec. 19, 1973

[21] Appl. No.: 426,215

Related U.S. Application Data

[62] Division of Ser. No. 224,973, Feb. 9, 1972, Pat. No. 3,793,329.

[30] Foreign Application Priority Data
Feb. 19, 1971 Germany............................ 2107989

[52] U.S. Cl. .............................................. 424/260
[51] Int. Cl............................................. A61k 27/00
[58] Field of Search ...................................... 424/260

[56] References Cited
UNITED STATES PATENTS

| | | | |
|---|---|---|---|
| 2,970,147 | 1/1961 | Grüssner............................ | 260/285 |
| 3,144,459 | 8/1964 | Sawa et al........................... | 424/260 |
| 3,257,406 | 6/1966 | Sawa et al........................... | 424/260 |

*Primary Examiner*—Albert T. Meyers
*Assistant Examiner*—Norman A. Drezin
*Attorney, Agent, or Firm*—Hammond & Littell

[57] ABSTRACT

Pharmaceutical compositions containing as an active ingredient a compound of the formula

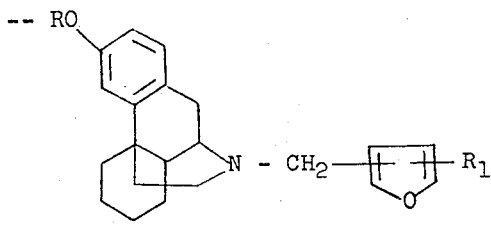

wherein
  R is hydrogen, methyl or acetyl, and
  $R_1$ is hydrogen, methyl or ethyl,
or a non-toxic, pharmacologically acceptable acid addition salt thereof; and a method of using the same as opiate antagonists, non-narcotic analgesics and antitussives.

10 Claims, No Drawings

PHARMACEUTICAL COMPOSITIONS CONTAINING AN N-(FURYL-METHYL)-3-OXY-MORPHINAN AND METHOD OF USE

This is a division of copending application Ser. No. 224,973, filed Feb. 9, 1972, now U.S. Pat. No. 3,793,329 issued Feb. 19, 1974.

This invention relates to novel pharmaceutical compositions containing as an active ingredient an N-(furylmethyl)-3-oxy-morphinan or a non-toxic, pharmacologically acceptable acid addition salt thereof, as well as to a method of using these compounds as opiate antagonists, non-narcotic analgesics and antitussives.

More particularly, the present invention relates to novel pharmaceutical compositions containing as an active ingredient an N-(furyl-methyl)-3-oxy-morphinan represented by the formula

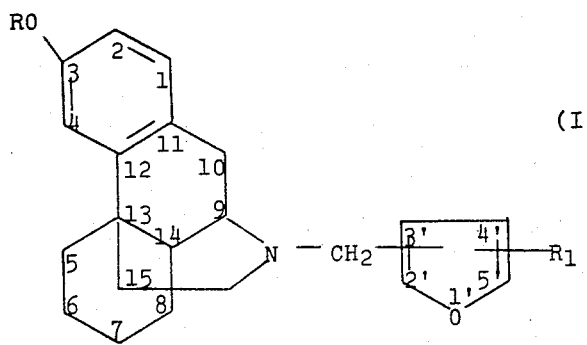

wherein
R is hydrogen, methyl or acetyl, preferably hydrogen, and
$R_1$ is hydrogen, methyl or ethyl,
or a non-toxic, pharmacologically acceptable acid addition salt thereof.

The compounds of the formula I are optically active, and the present invention therefore embraces compositions containing optically inactive racemates or racemic mixtures thereof, as well as the pure optical isomers.

The compounds embraced by formula I may be prepared by a number of different methods, among which the following, each starting from a 3-oxy-morphinan of the formula

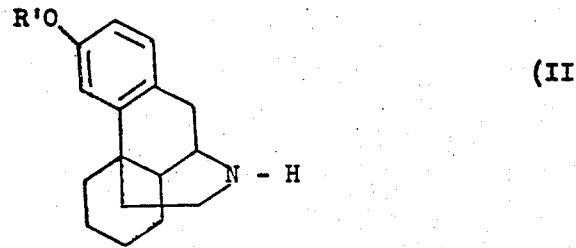

wherein R' is hydrogen, alkyl, aralkyl or acyl, have proved to be particularly convenient and efficient.

Method A

The reaction sequence for this method may be schematically represented as follows:

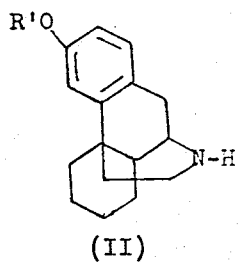

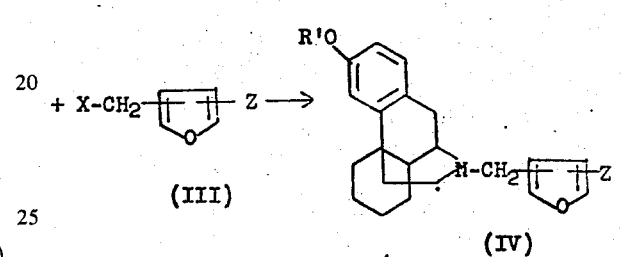

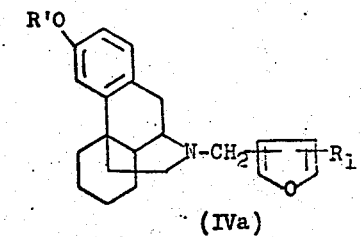

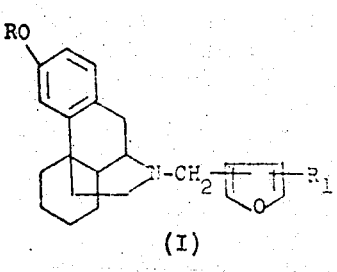

where
R = H, $CH_3$, $CH_3CO$
$R_1$ = H, $CH_3$, $C_2H_5$
R' = H, alkyl, aralkyl, acyl
Z = H, $CH_3$, $C_2H_5$ or a substituent which can be converted into H, $CH_3$ or $C_2H_5$, and
X = halogen, preferably chlorine or bromine, alkyl-$SO_2$—O or aryl-$SO_2$—O.

More particularly, the preparation of a compound of the formula I by this method comprises reacting a 3-oxy-morphinan of the formul II with a furan derivative of the formula III to form a compound of the formula IV; if Z in intermediate IV is other than the ultimately desired meaning of $R_1$, converting substituent Z by chemical reaction into hydrogen, methyl or ethyl to form an intermediate of the formula IV*a;* if R' in intermediate IV*a* is other than hydrogen and R in the end product of the formula I is to be hydrogen, deacylating or dealkylating the intermediate IV*a;* and, if R in the end product of the formula I is to be methyl or acetyl, optionally methylating or acetylating the intermediate of the formula IV*a* wherein R' is hydrogen.

The 3-oxy-morphinan of the formula II is reacted with the calculated amount or a slight excess of the furan derivative of the formula III in the presence of an acid-binding agent. Examples of suitable acid-binding agents are amines, such as triethylamine or dicyclohexyl-ethylamine; alkali metal carbonates, such as sodium carbonate or potassium carbonate; alkali metal bicarbonates, preferably sodium bicarbonate; metal hydroxides; and metal oxides. The reaction is advantageously performed in the presence of an inert organic solvent medium, such as tetrahydrofuran, dioxane, methylene chloride, dimethylformamide, dimethylsulfoxide, or preferably a mixture of tetrahydrofuran and dimethylformamide. The reaction temperature is variable between wide limites, but temperatures between 0°C and the boiling point of the particular solvent medium are preferred.

The other reactions of this method are performed in accordance with conventional procedures, and the reaction products are isolated and crystallized in conventional fashion.

Method B

The reaction sequence for this method may be schematically represented as follows:

where
R = H, $CH_3$, $CH_3CO$
$R_1$ = H, $CH_3$, $C_2H_5$
R' = H, alkyl, aralkyl, acyl, and
Z = H, $CH_3$, $C_2H_5$ or a substituent which can be converted into H, $CH_3$ or $C_2H_5$.

More particularly, the preparation of a compound of the formula I by this method comprises reacting a 3-oxy-morphinan of the formula II with formaldehyde and a furan derivative of the formula V to form a compound of the formula IV; if Z in intermediate IV is other than the ultimately desired meaning of $R_1$, converting substituent Z by chemical reaction into hydrogen, methyl or ethyl to form an intermediate of the formula IV*a;* if R' in intermediate IV*a* is other than hyrogen and R in the end product of the formula I is to be hydrogen, deacylating or dealkylating the intermediate IV*a;* and, if R in the end product of the formula I is to be methyl or acetyl, optionally methylating or acetylating the intermediate of the formula IV*a* wherein R' is hydrogen.

The reaction of the 3-oxy-morphinan of the formula II with formaldehyde and the furan derivative of the formula V is effected in an aqueous solution of an acid, especially of acetic acid, and preferably in aqueous 50% acetic acid. Other suitable solvent media are water, alcohols, tetrahydrofuran, dioxane or the like, as well as mixtures of two or more of these. The calculated amount or a slight excess of the furan derivative of the formula V is provided in solution or suspension in the solvent medium. The formaldehyde may be provided in the form of paraformaldehyde or preferably in aqueous solution; in either case it is provided in the calculated amount or in excess thereover. The reaction

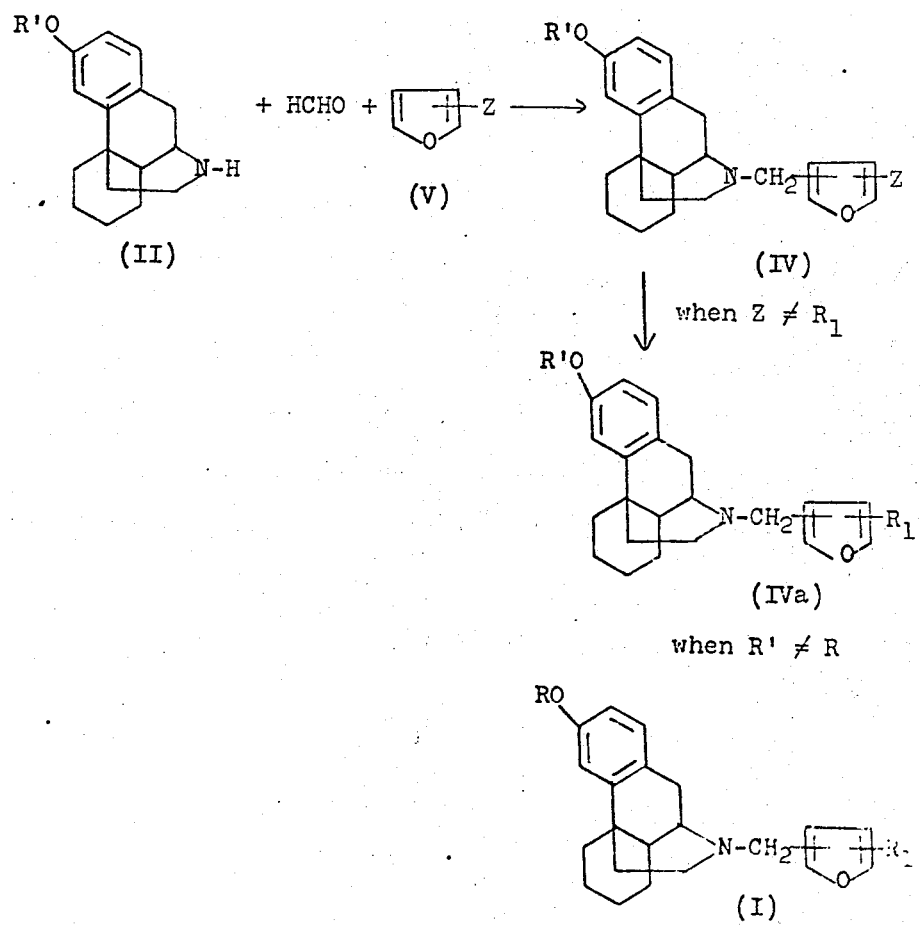

may be performed at a temperature between −10° C and the boiling point of the particular solvent medium, but the preferred temperature range is 0° to 40° C.

The other reactions of this method are performed in accordance with conventional procedures, and the reaction products are isolated and crystallized in conventional fashion.

Method C

The reaction sequence for this method may be schematically represented as follows:

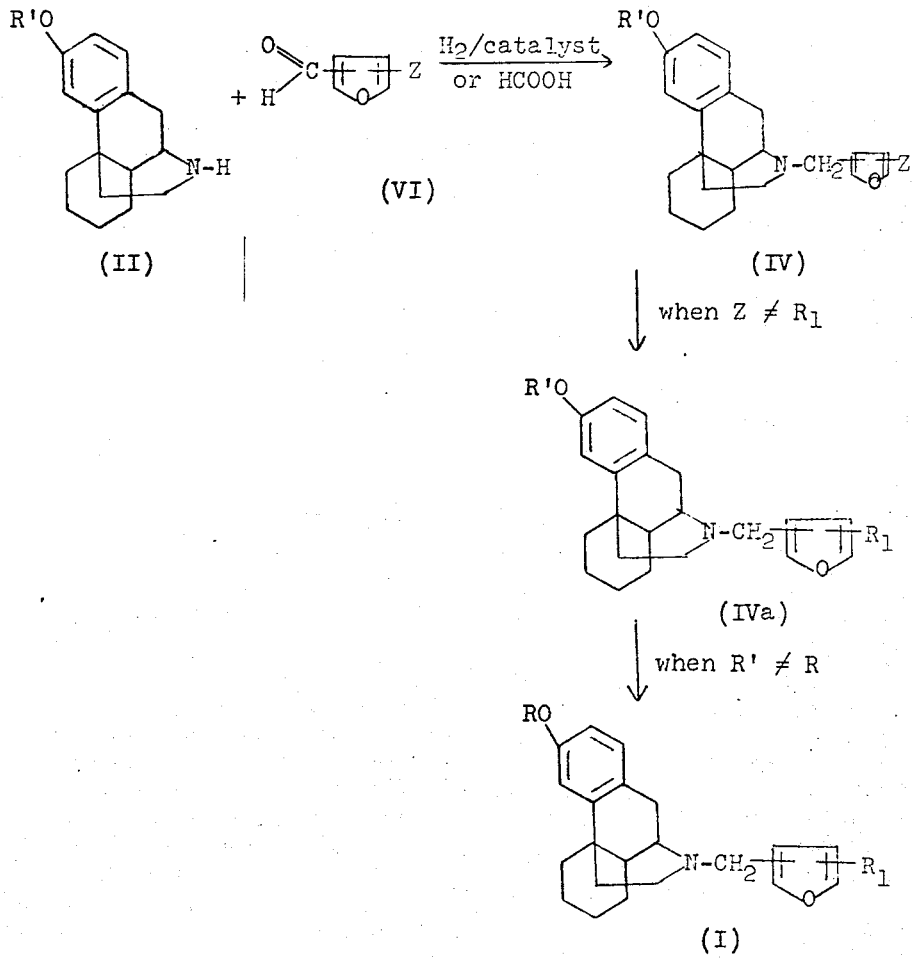

where
R = H, CH$_3$, CH$_3$CO
R$_1$ = H, CH$_3$, C$_2$H$_5$
R' = H, alkyl, aralkyl, acyl, and
Z = H, CH$_3$, C$_2$H$_5$ or a substituent which can be converted into H, CH$_3$ or C$_2$H$_5$.

More particularly, the preparation of a compound of the formula I by this method comprises reacting a 3-oxy-morphinan of the formula II with a furaldehyde of the formula VI in the presence of catalytically activated hydrogen or of formic acid to form a compound of the formula IV; if Z in intermediate IV is other than the ultimately desired meaning of R$_1$, converting substituent Z by chemical reaction into hydrogen, methyl or ethyl to form an intermediate of the formula IVa; if R' in intermediate IVa is other than hydrogen and R in the end product of the formula I is to be hydrogen, deacylating or dealkylating the intermediate IVa; and, if R in the end product of the formula I is to be methyl or acetyl, optionally methylating or acetylating the intermediate of the formula IVa wherein R' is hydrogen.

For the reductive alkylation in the presence of catalytically activated hydrogen the aldehyde of the formula VI is provided in the calculated amount or in excess, preferably in a ratio of up to 2 mols of aldehyde per mol of 3-oxy-morphinan. The reaction is performed in a suitable inert solvent, such as an alkanol, preferably in methanol or ethanol. Any desired hydrogenation catalyst may be used, such as Raney nickel and related catalysts, or also noble metal catalysts, such as palladium or platinum contact catalysts; the latter may be used in finely divided form either free or applied to conventional carriers, such as charcoal, barium sulfate, calcium carbonate, infusorial earth or the like. If necessary, the activity of the catalyst may be reduced, such as by sulfidation, to avoid undesired side-reactions. The amount of catalyst is not critical and may therefore vary within wide limits. The hydrogenation is advantageously performed at atmospheric pressure or at slightly elevated pressure, preferably at 1 to 3 atmospheres gauge, accompanied by stirring or shaking. High reaction temperatures favor side reactions; therefore, it is preferred to carry out the reductive alkylation at room temperature or moderately elevated temperatures up to about 60° C. The reaction product is isolated and crystallized by conventional methods.

The reaction of a 3-oxy-morphinan of the formula II with an aldehyde of the formula VI in the presence of formic acid is performed in aqueous solution, but will also proceed in an organic solvent medium. The aldehyde of the formula VI is provided in the calculated amount or in slight excess thereover, preferably in an amount of up to 1.5 mols per mol of 3-oxy-morphinan. The formic acid is advantageously provided in substantial excess, preferably in an amount of up to 10 mols per mol of 3-oxy-morphinan. The reaction is carried out at a temperature between 50° and 200° C, preferably at 80° to 150° C. The reaction product is isolated and crystallized by conventional procedures.

The other reactions of this method are performed in accordance with conventional procedures, and the reaction products are isolated and crystallized in conventional fashion.

Method D

The reaction sequence for this method may be schematically represented as follows:

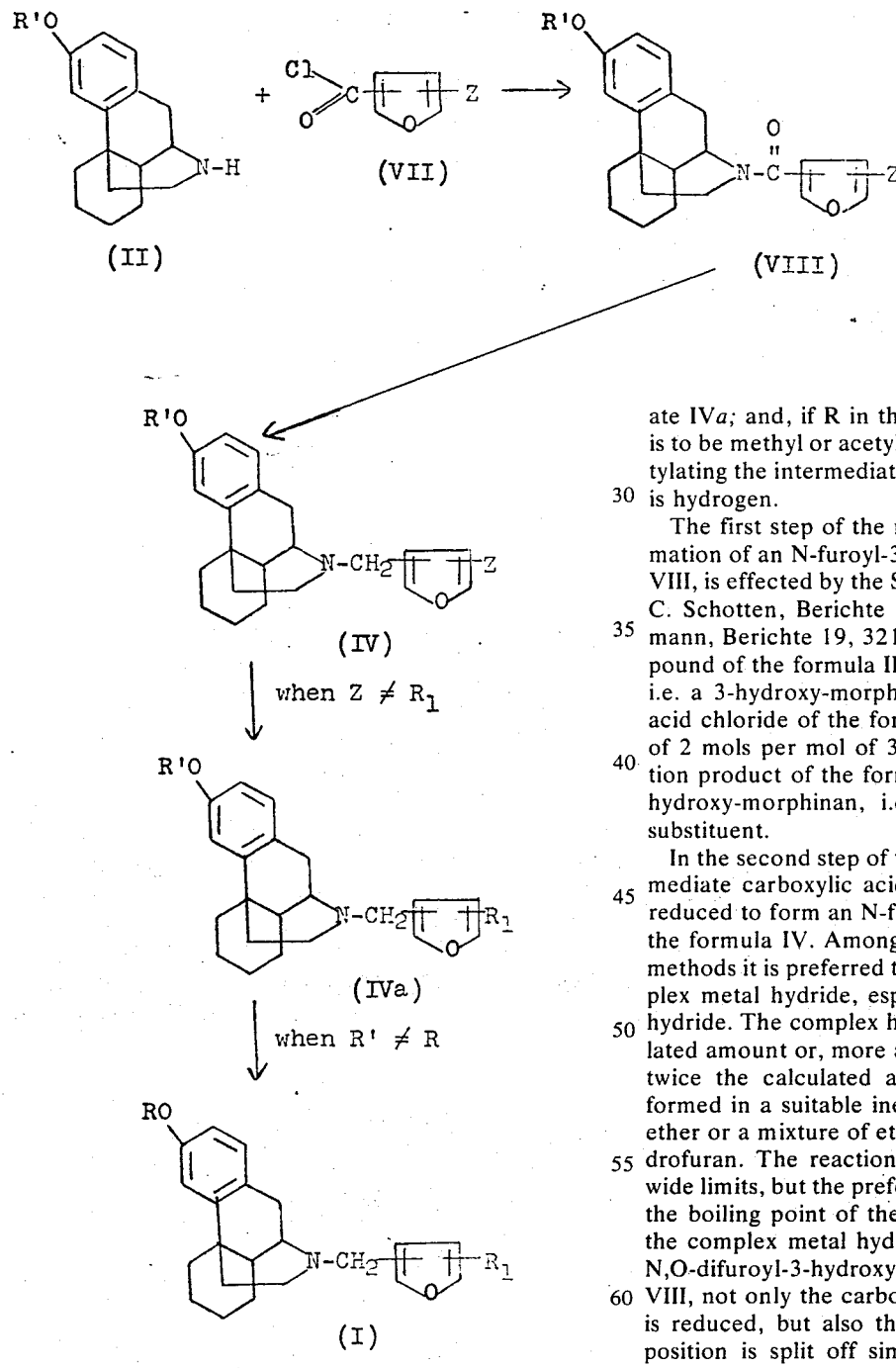

where
  R = H, $CH_3$, $CH_3CO$
  $R_1$ = H, $CH_3$, $C_2H_5$
  R' = H, alkyl, aralkyl, acyl, and
  Z = H, $CH_3$, $C_2H_5$ or a substituent which can be converted into H, $CH_3$ or $C_2H_5$.

More particularly, the preparation of a compound of the formula I by this method comprises reacting a 3-oxy-morphinan of the formula II with a furan-carboxylic acid chloride of the formula VII to form a compound of the formula VIII and reducing the same to a compound of the formula IV; if Z in intermediate IV is other than the ultimately desired meaning of $R_1$, converting substitutent Z by chemical reaction into hydrogen, methyl or ethyl to form an intermediate of the formula IVa; if R' in intermediate IVa is other than hydrogen and R in the end product of the formula I is to be hydrogen, deacylating or dealkylating the intermediate IVa; and, if R in the end product of the formula I is to be methyl or acetyl, optionally methylating or acetylating the intermediate of the formula IVa wherein R' is hydrogen.

The first step of the reaction sequence, i.e., the formation of an N-furoyl-3-oxy-morphinan of the formula VIII, is effected by the Schotten-Baumann method [see C. Schotten, Berichte 17, 2544 (1884); and E. Baumann, Berichte 19, 3213 (1886)]. If the starting compound of the formula II is one wherein R' is hydrogen, i.e. a 3-hydroxy-morphinan, and the furan-carboxylic acid chloride of the formula VII is provided in a ratio of 2 mols per mol of 3-hydroxy-morphinan, the reaction product of the formula VIII is an N,O-difuroyl-3-hydroxy-morphinan, i.e., R' is identical to the N-substituent.

In the second step of the reaction sequence the intermediate carboxylic acid amide of the formula VIII is reduced to form an N-furylmethyl-3-oxy-morphinan of the formula IV. Among the various suitable reduction methods it is preferred to use the reduction with a complex metal hydride, especially with lithium aluminum hydride. The complex hydride is provided in the calculated amount or, more advantageously, in excess up to twice the calculated amount. The reduction is performed in a suitable inert solvent medium, such as an ether or a mixture of ethers, and preferably in tetrahydrofuran. The reaction temperature may vary within wide limits, but the preferred range is between 0° C and the boiling point of the particular solvent medium. If the complex metal hydride reduction is applied to an N,O-difuroyl-3-hydroxy-morphinan of the formula VIII, not only the carbonyl group of the N-substituent is reduced, but also the O-acyl substituent in the 3-position is split off simultaneously, whereby a compound of the formula IV wherein R' is hydrogen is obtained.

The other reactions of this method are performed in accordance with conventional procedures, and the reaction products are isolated and crystallized in conventional fashion.

In a compound of the formula IV the substituent Z may have the same meanings as $R_3$ or may also be a substituent which may be converted into hydrogen, methyl or ethyl, such as carboxyl, formyl, hydroxymethyl, acetyl, formylmethyl or halogen, preferably chlorine or bromine.

Thus, if Z in formula IV is a carboxyl group, the intermediate may be converted into a compound of the formula IVa wherein $R_1$ is hydrogen by decarboxylation. If Z in formula IV is formyl, hydroxymethyl, acetyl or formylmethyl, the intermediate may be converted into a compound of the formula IVa wherein $R_1$ is methyl or ethyl by reduction pursuant to known methods, such as catalytic hydrogenation, with sodium/alcohol, with nascent hydrogen generated by zinc/acetic acid, or by the Wolff-Kishner Reduction. Finally, if Z in formula IV is halogen, preferably chlorine or bromine, the intermediate may be converted into a compound of the formula IVa wherein $R_1$ is hydrogen by catalytic reduction.

The starting compounds required for methods A through D, i.e., the 3-oxy-morphinans of the formula II, are known compounds and may be prepared by conventional methods. The starting compounds may be optically inactive racemates or optically active antipodes; if the starting compound in methods A through D is a racemate or racemic mixture, the end product of the formula I is also a racemate or racemic mixture, which may subsequently be separated into its optically active antipode components by conventional methods. Analogously, if the starting compound is an optically active 3-oxy-morphinan, the end product is the corresponding optically active compound of the formula I.

Using the above-described methods, the following specific compounds of the formula I may be prepared:

N-Furfuryl-3-hydroxy-morphinan
N-Furfuryl-3-methoxy-morphinan
N-Furfuryl-3-acetoxy-morphinan
N-(3'-Methyl-furfuryl)-3-hydroxy-morphinan
N-(3'-Methyl-furfuryl)-3-methoxy-morphinan
N-(3'-Methyl-furfuryl)-3-acetoxy-morphinan
N-(5'-Methyl-furfuryl)-3-hydroxy-morphinan
N-(5'-Methyl-furfuryl)-3-methoxy-morphinan
N-(5'-Methyl-furfuryl)-3-acetoxy-morphinan
N-[Furyl-methyl-(3')]-3-hydroxy-morphinan
N-[Furyl-methyl-(3')]-3-methoxy-morphinan
N-[Furyl-methyl-(3')]-3-acetoxy-morphinan
N-(5'-Ethyl-furfuryl)-3-hydroxy-morphinan
N-(5'-Ethyl-furfuryl)-3-methoxy-morphinan
N-(5'-Ethyl-furfuryl)-3-acetoxy-morphinan
N-[2'-Methyl-furyl-methyl-(3')]-3-hydroxy-morphinan
N-[2'-Methyl-furyl-methyl-(3')]-3-methoxy-morphinan
N-[2'-Methyl-furyl-methyl-(3')]-3-acetoxy-morphinan
N-[2'-Ethyl-Furyl-methyl-(3')]-3-hydroxy-morphinan
N-[2'-Ethyl-furyl-methyl-(3')]-3-methoxy-morphinan
N-[2'-Ethyl-furyl-methyl-(3')]-3-acetoxy-morphinan
N-(4'-Methyl-furfuryl)-3-hydroxy-morphinan
N-(4'-Methyl-furfuryl)-3-methoxy-morphinan
N-(4'-Methyl-furfuryl)-3-acetoxy-morphinan
N-[4'-Methyl-furyl-methyl-(3')]-3-hydroxy-morphinan
N-[4'-Methyl-furyl-methyl-(3')]-3-methoxy-morphinan
N-[4'-Methyl-furyl-methyl-(3')]-3-acetoxy-morphinan
N-[5'-Methyl-furyl-methyl-(3')]-3-hydroxy-morphinan
N-[5'-Methyl-furyl-methyl-(3')]-3-methoxy-morphinan
N-[5'-Methyl-furyl-methyl-(3')]-3-acetoxy-morphinan The compounds embraced by formula I are organic bases and therefore form acid addition salts with inorganic or organic acids. Examples of non-toxic, pharmacologically acceptable acid addition salts are those formed with hydrochloric acid, hydrobromic acid, hydroiodic acid, hydrofluoric acid, sulfuric acid, phosphoric acid, nitric acid, acetic acid, propionic acid, butyric acid, valeric acid, pivalic acid, caproic acid, oxalic acid, malonic acid, succinic acid, maleic acid, fumaric acid, lactic acid, tartaric acid, citric acid, malic acid, benzoic acid, phthalic acid, cinnamic acid, salicylic acid, ascorbic acid, 8-chlorotheophylline, methanesulfonic acid or the like.

The following examples illustrate the preparation of various compounds of the formula I.

EXAMPLE 1

(±)-N-Furfuryl-3-hydroxy-morphinan and its hydrochloride by Method A a. A mixture consisting of 9.72 gm (0.04 mol) of (±)-3-hydroxy-morphinan, 5 gm (0.06 mol) of sodium bicarbonate, 5.12 gm (0.044 mol) of furfuryl chloride, 24 ml of dimethylformamide and 40 ml of tetrahydrofuran was refluxed for three hours. Thereafter, the reaction solution was evaporated in vacuo, and the residue was shaken with a mixture of water and chloroform. The chloroform phase was isolated, washed with water, dried with sodium sulfate and evaporated in vacuo, leaving as a residue raw (±)-N-furfuryl-3-hydroxymorphinan.

b. The raw product obtained in (a) was dissolved in 50–80 ml of absolute ethanol while adding 8 ml of 5N ethanolic hydrochloric acid thereto, and the resulting solution was admixed with absolute ether until it became just turbid and then allowed to stand in a refrigerator overnight. The crystalline substance which had separated out was then collected by vacuum filtration, and the filter cake was washed first with ethanol/ether and then with ether, and dried first in the air at room temperature and then in a drying chamber at 80° C, yielding 11.2 gm (78% of theory) of the compound of the formula

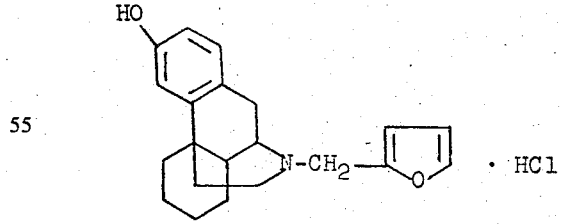

having a melting point of 232°–234° C. Recrystallization from ethanol/ether raised the melting point to 238°–240° C.

EXAMPLE 2

Using a procedure analogous to that described in Example 1(a), 10.0 gm (80.5% of theory) of (−)-N-furfuryl-3-hydroxy-morphinan, m.p. 197°–198° C (recrystallized from methanol), specific rotation $[\alpha]_D^{25}$ = −106° (c = 1 gm/100 ml methanol) were obtained from 9.72 gm (0.04 mol) of (−)-3-hydroxy-morphinan and 5.12 gm (0.044 mol) of furfuryl chloride. Further recrystallization of the product from ethyl acetate raised the melting point to 206°–207° C.

EXAMPLE 3

Using a procedure analogous to that described in Example 1(a), 74% of theory of N-[furyl-methyl-(3')]-3-hydroxy-morphinan, m.p. 206° C of the formula

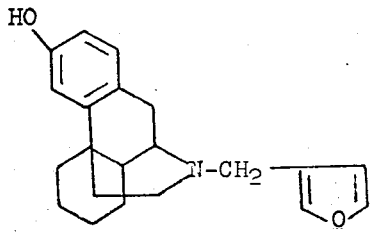

was obtained from racemic 3-hydroxy-morphinan and 3-chloromethyl-furan.

EXAMPLE 4

Using a procedure analogous to that described in Example 1(a), 51% of theory of (−)-N-[furyl-methyl-(3')]-3-hydroxy-morphinan, m.p. 243° C, was obtained from (−)-3-hydroxy-morphinan and 3-chloromethyl-furan.

EXAMPLE 5

Using a procedure analogous to that described in Example 1(a), 81% of theory of (+)-N-[furyl-methyl-(3')]-3-hydroxy-morphinan, m.p. 242° C, was obtained from (+)-3-hydroxy-morphinan and 3-chloromethyl-furan.

EXAMPLE 6

Using a procedure analogous to that described in Example 1(a), 80% of theory of N-[2'-methyl-furyl-methyl-(3')]-3-hydroxy-morphinan, m.p. 180°–182° C, of the formula

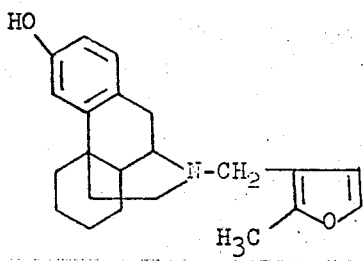

was obtained from racemic 3-hydroxy-morphinan and 2-methyl-3-chloromethyl-furan.

EXAMPLE 7

Using a procedure analogous to that described in Example 1(a), 74% of theory of (−)-N-[2'-methyl-furyl-methyl-(3')]-3-hydroxy-morphinan, m.p. 176° C, was obtained from (−)-3-hydroxy-morphinan and 2-methyl-3-chloromethyl-furan.

EXAMPLE 8

Using a procedure analogous to that described in Example 1(a), 63% of theory of (+)-N-[2'-methyl-furyl-methyl-(3')]-3-hydroxy-morphinan, m.p. 175° C, was obtained from (+)-3-hydroxy-morphinan and 2-methyl-3-chloromethyl-furan.

EXAMPLE 9

Using a procedure analogous to that described in Example 1, 95% of theory of N-[2'-ethyl-furyl-methyl-(3')]-3-hydroxy-morphinan hydrochloride, m.p. 180° C, of the formula

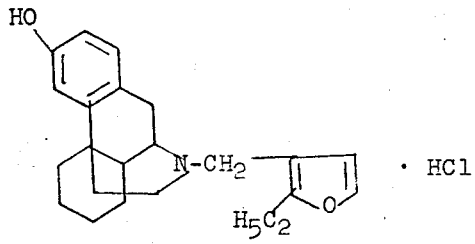

was obtained from racemic 3-hydroxy-morphinan and 2-ethyl-3-chloromethyl-furan.

EXAMPLE 10

Using a procedure analogous to that described in Example 1(a), 91% of theory of N-[2'-ethyl-furyl-methyl-(3')]-3-hydroxy-morphinan, m.p. 160° C, was obtained from racemic 3-hydroxy-morphinan and 2-ethyl-3-chloromethyl-furan.

EXAMPLE 11

Using a procedure analogous to that described in Example 1(a), 74% of theory of (+)-N-[2'-methyl-furyl-methyl-(3')]-3-hydroxy-morphinan, m.p. 158° C, was obtained from (+)-3-hydroxy-morphinan and 2-ethyl-3-chloromethyl-furan.

EXAMPLE 12

Using a procedure analogous to that described in Example 1, N-furfuryl-3-acetoxy-morphinan hydrochloride, m.p. 165°–170° C, of the formula

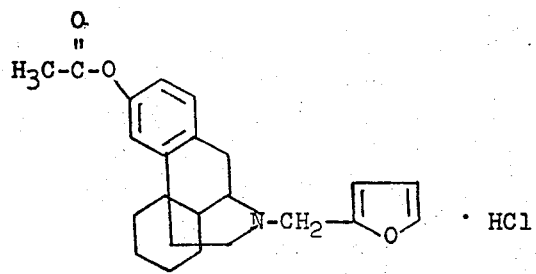

was prepared from racemic 3-acetoxy-morphinan and furfuryl chloride.

EXAMPLE 13

Using a procedure analogous to that described in Example 1, N-furfuryl-3-methoxy-morphinan hydrochloride, m.p. 202°–204° C, of the formula

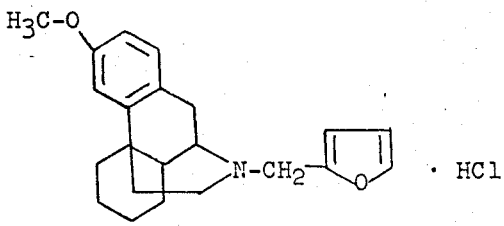

was prepared from racemic 3-methoxy-morphinan and furfuryl chloride.

EXAMPLE 14

(+)-N-(5'-Methyl-furfuryl)-3-hydroxy-morphinan by method B 2.43 gm (0.01 mol) of (+)-3-hydroxy-morphinan and 1.1 gm of 30% formalin (0.011 mol CH₂O) were dissolved in 10 ml of aqueous 50% acetic acid, and, while stirring, the resulting solution was admixed with 0.90 gm (0.011 mol) of 2-methyl-furan, and the resulting mixture was stirred for 15 hours at room temperature. Thereafter, the reaction solution was evaporated in vacuo, and the residue was shaken with a mixture of chloroform and water while adding ammonia until distinct alkaline reaction. The chloroform phase was isolated, washed with water, dried with sodium sulfate and evaporated in vacuo. The residue was crystallized from 10 ml of acetone, yielding 2.9 gm (86% of theory) of the compound of the formula

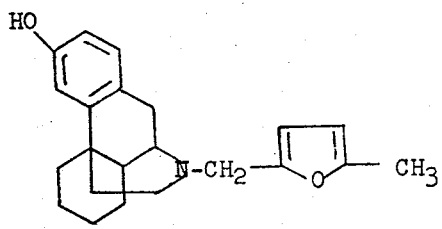

having a melting point of 200°–203° C. Recrystallization from aqueous methanol raised the melting point to 206°–207° C.

EXAMPLE 15

Using a procedure analogous to that described in Example 14, 77% of theory of (−)-N-(5'-methyl-furfuryl)-3-hydroxy-morphinan, m.p. 208° C, was obtained from (−)-3-hydroxy-morphinan, formaldehyde and 2-methyl-furan.

EXAMPLE 16

Using a procedure analogous to that described in Example 14, 56% of theory of (±)-N-(5'-methyl-furfuryl)-3-hydroxy-morphinan, m.p. 209° C, was obtained from racemic 3-hydroxy-morphinan, formaldehyde and 2-methyl-furan.

EXAMPLE 17

Using a procedure analogous to that described in Example 14, 63% of theory of N-(5'-ethyl-furfuryl)-3-hydroxy-morphinan, m.p. 200°–203° C, of the formula

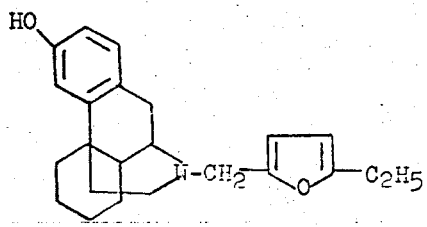

was obtained from 3-hydroxy-morphinan, formaldehyde and 2-ethyl-furan.

EXAMPLE 18

Using a procedure analogous to that described in Example 14, 49% of theory of (−)-N-(5'-ethyl-furfuryl)-3-hydroxy-morphinan, m.p. 160°–163° C, was obtained from (−)-3-hydroxy-morphinan, formaldehyde and 2-ethyl-furan.

EXAMPLE 19

Using a procedure analogous to that described in Example 14, N-(5'-methyl-furfuryl)-3-methoxy-morphinan of the formula

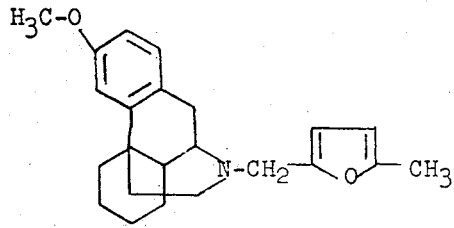

was prepared from 3-methoxy-morphinan, formaldehyde and 2-methyl-furan.

EXAMPLE 20

Using a procedure analogous to that described in Example 14, N-(5'-ethyl-furfuryl)-3-methoxy-morphinan of the formula

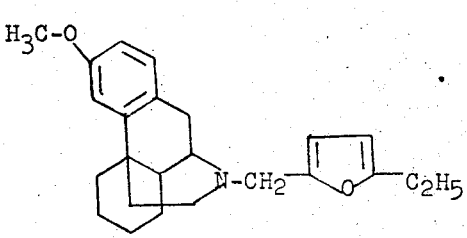

was prepared from 3-methoxy-morphinan, formaldehyde and 2-ethyl-furan.

EXAMPLE 21

(+)-N-Furfuryl-3-hydroxy-morphinan by method C 2.43 gm (0.01 mol) of (+)-3-hydroxy-morphinan and 1.92 gm (0.02 mol) of freshly distilled furfurol were dissolved in 110 ml of methanol, and the solution was immediately hydrogenated with hydrogen at atmospheric pressure in the presence of 0.2 gm of palladized charcoal (10%), accompanied by stirring. After the calculated amount of hydrogen had been absorbed (after about 45 minutes), the hydrogenation was terminated, the catalyst was filtered off, and the filtrate was evaporated in vacuo. The brown residue was briefly boiled with a mixture of 100 ml of water and 1 gm of methanesulfonic acid, accompanied by stirring, the still warm mixture was filtered to remove insoluble matter, and the filtrate was made alkaline with ammonia. The alkaline solution was extracted several times with chloroform, the combined organic extracts were washed with water, dried with sodium sulfate and evaporated in vacuo, and the residue was chromatographed in a silicagel (300 gm) column, using a mixture of chloroform/methanol/concentrated ammonia (90:10:0.1) as the solvent medium. The eluant fractions containing the reaction product were combined and evaporated in vacuo, and the residue was crystallized from ethyl acetate, yielding 0.55 gm (17% of theory) of (+)-N-furfuryl-3-hydroxy-morphinan having a melting point of 205°–206° and a specific rotation $[\alpha]_D^{25} = +104°$ (c = 1 gm/100 ml methanol).

EXAMPLE 22

(±)-N-(3'-Methyl-furfuryl)-3-hydroxy-morphinan and its hydrochloride by method D a. 2.43 gm (0.01 mol) of (±)-3-hydroxy-morphinan were dissolved in 35 ml of warm methanol and, while stirring, the solution was admixed with a solution of 2.5 gm of potassium carbonate in 4 ml of water. The mixed solution was allowed to cool to 20° C, and then 1.74 gm (0.011 mol) of 3-methyl-furan-2-carboxylic acid chloride were added over a period of 10 minutes, and the mixture was vigorously stirred for 5 hours. Thereafter, the methanol was evaporated in vacuo, the residue was shaken with a mixture of chloroform and water, and the chloroform phase was isolated, washed once with 2N hydrochloric acid and then twice with water, dried with sodium sulfate and evaporated in vacuo. The residue was dissolved in absolute benzene, and the solution was again evaporated in order to remove residual traces of chloroform and water, leaving virtually pure (±)-N-(3'-methyl-2'-furoyl)-3-hydroxy-morphinan.

b. The end product obtained in (a) was dissolved in 50 ml of absolute tetrahydrofuran, and the solution was added dropwise to a suspension of 0.76 gm (0.02 mol) of lithium aluminum hydride in 25 ml of tetrahydrofuran, while stirring and cooling the latter, at 10° C. The resulting mixture was stirred overnight at room temperature, and then, while cooling it on an ice bath and vigorously stirring it, 1.5 ml of water were added dropwise and then 75 ml of a saturated aqueous diammonium tartrate solution were added. The resulting mixture was stirred for 1 hour, and the tetrahydrofuran phase was isolated in a separator funnel and then evaporated in vacuo. The aqueous phase was extracted three times with chloroform, the chloroform extracts were combined, the evaporation residue of the tetrahydrofuran phase was dissolved therein, and the resulting solution was washed with water, dried with sodium sulfate and evaporated, leaving as a residue (±)-N-(3'-methyl-furfuryl)-3-hydroxy-morphinan.

c. The end product obtained in (b) was dissolved in 20 ml of ethanol, the resulting solution was made just acid with ethanolic 5N hydrochloric acid, and then absolute ether was added until the solution became turbid. The mixture was allowed to stand overnight in a refrigerator, the crystalline substance which had separated out during that time was collected by vacuum filtration, and the filter cake was washed first with ethanol/ether and then with ether, and subsequently dried in the air at room temperature and finally briefly at 80° C in a drying chamber, yielding 2.8 gm (75% of theory) of the compound of the formula

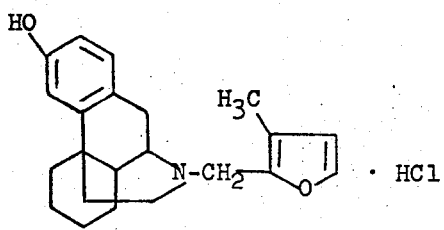

having a melting point of 235° C.

EXAMPLE 23

(−)-N-(3'-Methyl-furfuryl)-3-hydroxy-morphinan by method D a. 1.84 gm (0.0075 mol) of (−)-3-hydroxy-morphinan were suspended in a mixture consisting of 19 ml of absolute methylene chloride and 3 ml of triethylamine, and, while stirring the suspension, a solution of 0.40 gm (0.0185 mol) of 3-methyl-furan-2-carboxylic acid chloride in 9.5 ml of absolute methylene chloride was added over a period of about 30 minutes. The resulting mixture was refluxed for 4 hours, then cooled and subsequently, in the presence of ice, washed twice with 7.5 ml of hydrochloric acid each and then three times with water. The methylene chloride phase was separated, dried with sodium sulfate and evaporated in vacuo, leaving (−)-N,O-di-(3'-methyl-2'-furoyl)-3-hydroxy-morphinan.

b. The end product obtained in (a) was dissolved in 70 ml of absolute tetrahydrofuran, and the resulting solution was added dropwise to a suspension of 0.57 gm (0.0150 mol) of lithium aluminum hydride in 15 ml of absolute tetrahydrofuran at 5°–10° C, accompanied by stirring and cooling. The resulting mixture was stirred overnight at room temperature and thereafter refluxed for 15 minutes. While cooling the reaction mixture on an ice bath and stirring, 1.2 ml of water were added dropwise and then 60 ml of a saturated aqueous diammonium tartrate solution were added, and the mixture was vigorously stirred for 1 hour. Thereafter, the reaction mixture was worked up as described in Example 22(b), and the evaporation residue of the chloroform solution was crystallized from methanol/water, yielding 2.4 gm (71.5% of theory) of (−)-N-(3'-methyl-furfuryl)-3-hydroxy-morphinan, having a melting point of 108° C which did not change upon further recrystallization from methanol/water.

EXAMPLE 24

Using a procedure analogous to that described in Example 23, 92% of theory of (+)-N-(3'-methyl-furfuryl)-3-hydroxy-morphinan, m.p. 108°C, was obtained from (+)-3-hydroxy-morphinan and 3-methyl-furan-2-carboxylic acid chloride.

EXAMPLE 25

Using a procedure analogous to that described in Example 22(a) and (b), 49% of theory of (−)-N-(4'-methyl-furfuryl)-3-hydroxy-morphinan, m.p. 172° C, was obtained from (−)-3-hydroxy-morphinan and 4-methyl-furan-2-carboxylic acid chloride.

EXAMPLE 26

Using a procedure analogous to that described in Example 22(a) and (b), 61% of theory of (−)-N-[4'-methyl-furyl-methyl-(3')]-3-hydroxy-morphinan, m.p. 195°–198° C, was obtained from (−)-3-hydroxy-morphinan and 4-methyl-furan-3-carboxylic acid chloride.

EXAMPLE 27

Using a procedure analogous to that described in Example 22(a) and (b), 80% of theory of (−)-N-[5'-methyl-furyl-methyl-(3')]-3-hydroxy-morphinan, m.p. 196°–198° C, was obtained from (−)-3-hydroxy-morphinan and 5-methyl-furan-3-carboxylic acid chloride. The compounds embraced by formula I above and their nontoxic, pharmacologically acceptable acid addition salts, having useful pharmacodynamic properties. More particularly, they exhibit opiate antagonist, non-narcotic analgesic and antitussive activities in warm-blooded animals, such as mice and rats.

The compounds of the formula I were tested for analgesic activity in mice and rats by various standard pharmacological test methods, namely:

1. The Haffner method [Deutsche Medizinische Wochenschrift 55, 731 (1929)];
2. The "hot-plate" method [J. Pharmacol. exp. Therap. 80, 300 (1944)]; and
3. The writhing test [J. Pharmacol. exp. Therap. 154, 319 (1966)].

In the Haffner test, the compounds were found to be inactive. However, in the "hot-plate" test and the writhing test the compounds exhibited distinct dose-dependent analgesic activities. In accordance with prevailing teachings [Adv. Chem. Ser. 49, 162–169 (1964)], analgesic inactivity in the Haffner test is an indication that the compounds possess no morphine-like physical dependence capacity, i.e., produce no narcotic addiction. On the other hand, however, analgesic activity in the "hot-plate" test and the writhing test proves that the compounds of the instant invention are effective analgesics.

For pharmaceutical purposes the compounds of the formula I or their non-toxic acid addition salts are administered to warm-blooded animals perorally, enterally or parenterally as active ingredients in customary dosage unit compositions, that is, compositions in dosage unit form consisting essentially of an inert pharmaceutical carrier and one effective dosage unit of the active ingredient, such as tablets, coated pills, capsules, wafers, powders, solutions, suspensions, emulsions, syrups, suppositories and the like. One effective analgesic and antitussive dosage unit of the compounds according to the present invention is from 0.166 to 5.0 mgm/kg body weight, preferably 0.83 to 2.5 mgm/kg body weight.

The following examples illustrate a few pharmaceutical dosage unit compositions comprising a compound of the formula I or a non-toxic acid addition salt thereof as an active ingredient and represent the best modes contemplated of putting the invention into practical use. The parts are parts by weight unless otherwise specified.

EXAMPLE 28

Tablets

The tablet composition is compounded from the following ingredients:

| | | |
|---|---|---|
| N-Furfuryl-3-hydroxy-morphinan | 50.0 | parts |
| Lactose | 95.0 | do. |
| Corn starch | 45.0 | do. |
| Colloidal silicic acid | 2.0 | do. |
| Soluble starch | 5.0 | do. |
| Magnesium stearate | 3.0 | do. |
| Total | 200.0 | parts |

Preparation:

The morphinan compound is intimately admixed with the lactose and the corn starch, the mixture is moistened with an aqueous 10% solution of the soluble starch, the moist mass is forced through a 1 mm-mesh screen, the resulting granulate is dried at 40°C, the dry granulate is admixed with the colloidal silicic acid, and the composition is compressed into 200 mgm-tablets in a conventional tablet making machine.

Each tablet contains 50 mgm of the morphinan compound and is an oral dosage unit composition with effective analgesic and antitussive actions.

EXAMPLE 29

Coated pills

The pill core composition is compounded from the following ingredients:

| | | |
|---|---|---|
| N-Furfuryl-3-hydroxy-morphinan | 75.0 | parts |
| Lactose | 100.0 | do. |
| Corn starch | 65.0 | do. |
| Colloidal silicic acid | 2.0 | do. |
| Soluble starch | 5.0 | do. |
| Magnesium stearate | 3.0 | do. |
| Total | 250.0 | parts |

Preparation:

The ingredients are compounded in the same manner as in Example 28, and the composition is compressed into 250 mgm-pill cores which are subsequently coated with a thin shell consisting essentially of a mixture of sugar, talcum and gum arabic and finally polished with beeswax. Each coated pill contains 75 mgm of the morphinan compound and is an oral dosage unit composition with effective analgesic and antitussive activities.

EXAMPLE 30

Suppositories

The suppository composition is compounded from the following ingredients:

| | | |
|---|---|---|
| N-(3'-Methyl-furfuryl)-3-hydroxy-morphinan hydrochloride | 50.0 | parts |
| Lactose | 250.0 | do. |
| Suppository base (e.g. cocoa butter) | 1400.0 | do. |
| Total | 1700.0 | parts |

Preparation:

The morphinan compound is intimately admixed with the lactose, and the mixture is blended with the aid of an immersion homogenizer into the suppository base which had previously been melted and cooled to about 40°C. 1,700 mgm-portions of the composition are poured into cooled suppository molds and allowed to harden therein. Each suppository contains 50 mgm of the morphinan compound and is a rectal dosage unit composition with effective analgesic and antitussive actions.

EXAMPLE 31

Hypodermic solution

The solution is compounded from the following ingredients:

| | | | |
|---|---|---|---|
| N-(3'-Methyl-furfuryl)-3-hydroxy-morphinan hydrochloride | | 75.0 | parts |
| Sodium chloride | | 5.0 | do. |
| Double-distilled water | q.s.ad | 2000.0 | do. by vol. |

Preparation:

The morphinan compound and the sodium chloride are dissolved in the double-distilled water, the solution is filtered until free from suspended particles, and the filtrate is filled under aseptic conditions into 2 cc-ampules which are subsequently sterilized and sealed. Each ampule contains 75 mgm of the morphinan compound, and its contents are an injectable dosage unit composition with effective analgesic and antitussive actions.

EXAMPLE 32

Drop solution

The solution is compounded from the following ingredients:

| | | | |
|---|---|---|---|
| N-[2'-Methyl-furyl-methyl-(3')]-3-hydroxy-morphinan | | 0.70 | parts |
| Methyl p-hydroxy-benzoate | | 0.07 | do. |
| Propyl p-hydroxy-benzoate | | 0.03 | do. |
| Demineralized water | q.s.ad | 100.0 | do. by vol. |

Preparation:

The morphinan compound and the p-hydroxy-benzoates are dissolved in the demineralized water, the solution is filtered, and the filtrate is filled into 100 ml-bottles. 10 ml of the solution contain 70 mgm of the morphinan compound and are an oral dosage unit composition with effective analgesic and antitussive actions.

Analogous results are obtained when any one of the other morphinans embraced by formula I or a non-toxic acid addition salt thereof is substituted for the particular morphinan in Examples 28 through 32. Likewise, the amount of active ingredient in these illustrative examples may be varied to achieve the dosage unit range set forth above, and the amounts and nature of the inert pharmaceutical carrier ingredients may be varied to meet particular requirements.

While the present invention had been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:

1. A non-narcotic analgesic and antitussive pharmaceutical dosage unit composition consisting essentially of an inert pharmaceutical carrier and an effective analgesic and antitussive amount of a racemic mixture of a compound of the formula

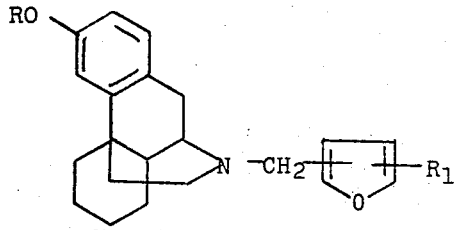

wherein
R is hydrogen, methyl or acetyl, and
$R_1$ is hydrogen, methyl or ethyl,
an optically active isomer component thereof, or a non-toxic, pharmacologically acceptable acid addition salt of said racemic mixture or optically active isomer.

2. A pharmaceutical composition of claim 1, wherein said compound is one where R is hydrogen and $R_1$ is hydrogen, methyl or ethyl.

3. A pharmaceutical composition of claim 1, wherein said compound is racemic or optically active N-furfuryl-3-hydroxy-morphinan or a non-toxic, pharmacologically acceptable acid addition salt thereof.

4. A pharmaceutical composition of claim 1, wherein said compound is racemic or optically active N-(3'-methyl-furfuryl)-3-hydroxy-morphinan or a non-toxic, pharmacologically acceptable acid addition salt thereof.

5. A pharmaceutical composition of claim 1, wherein said compound is racemic or optically active N-[2'-methyl-furylmethyl-(3')]-3-hydroxy-morphinan or a non-toxic, pharmacologically acceptable acid addition salt thereof.

6. The method of raising the pain threshold and suppressing the cough reflex in a warm-blooded animal in need of such treatment, which comprises perorally, parenterally or rectally administering to said animal from 0.166 to 5.0 mgm/kg body weight of a racemic mixture of a compound of the formula

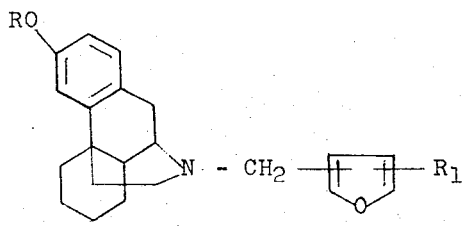

wherein
R is hydrogen, methyl or acetyl, and u
$R_1$ is hydrogen, methyl or ethyl,
an optically active isomer component thereof, or a non-toxic, pharmacologically acceptable acid addition salt of said racemic mixture or optically active isomer.

7. The method of claim 6, wherein said compound is one where R is hydrogen and $R_1$ is hydrogen, methyl or ethyl.

8. The method of claim 6, wherein said compound is racemic or optically active N-furfuryl-3-hydroxy-morphinan or a non-toxic, phamacologically acceptable acid addition salt thereof.

9. The method of claim 6, wherein said compound is racemic or optically active N-(3'-methyl-furfuryl)-3-hydroxy-morphinan or a non-toxic, pharmacologically acceptable acid addition salt thereof.

10. The method of claim 6, wherein said compound is racemic or optically active N-[2'-methyl-furylmethyl-(3')]-3-hydroxy-morphinan or a non-toxic, pharmacologically acceptable acid addition salt thereof.

* * * * *